United States Patent [19]

Steiner et al.

[11] Patent Number: 4,743,886
[45] Date of Patent: May 10, 1988

[54] TESTING APPARATUS FOR INTRUSION DETECTORS

[75] Inventors: Peter Steiner, Jona; Rudolf Genähr, Männedorf; David Siegwart, Meilen, all of Switzerland

[73] Assignee: Cerberus AG, Männedorf, Switzerland

[21] Appl. No.: 783,222

[22] PCT Filed: Feb. 7, 1985

[86] PCT No.: PCT/EP85/00035
§ 371 Date: Sep. 23, 1985
§ 102(e) Date: Sep. 23, 1985

[87] PCT Pub. No.: WO85/03589
PCT Pub. Date: Aug. 15, 1985

[30] Foreign Application Priority Data

Feb. 13, 1984 [CH] Switzerland .................... 760/84

[51] Int. Cl.$^4$ .................... G08B 29/00; G08B 13/18
[52] U.S. Cl. .................... 340/514; 340/515; 340/554; 340/561; 340/565; 340/567; 367/94
[58] Field of Search ............ 340/514, 515, 506, 516, 340/551–554, 561–565, 567; 367/93, 94, 199

[56] References Cited

U.S. PATENT DOCUMENTS

| 2,782,405 | 2/1957 | Weisz et al. | |
| 3,781,859 | 12/1973 | Hermans | 340/514 |
| 3,786,468 | 1/1974 | Moffitt | 340/515 |
| 3,851,301 | 11/1974 | Demers et al. | 340/515 |
| 4,118,688 | 10/1978 | Glennon | 340/506 |
| 4,253,091 | 2/1981 | Frydman | 340/506 |
| 4,414,539 | 11/1983 | Armer | 340/514 |
| 4,517,554 | 5/1985 | Moser et al. | 340/514 |

Primary Examiner—Donnie L. Crosland
Attorney, Agent, or Firm—Werner W. Kleeman

[57] ABSTRACT

The monitoring of intrusion detectors is effected by an apparatus for testing the responsiveness to environment-caused, detector-specific useful and spurious signals. This testing apparatus is arranged inside of the intrusion detector and ensures that during installation and during the operation of the intrusion detector its electrical parameters are optimally adjusted. Deviations of these parameters from their nominal values and the location of these deviations are indicated.

6 Claims, 4 Drawing Sheets

TESTING APPARATUS FOR INTRUSION DETECTORS

BACKGROUND OF THE INVENTION

The present invention relates to a new and improved apparatus for testing the responsiveness of an intrusion detector to environment-caused and detector-specific useful and spurious signals and for locating the electrical parameters which deviate from the nominal value.

Presently it is known that, for monitoring objects such as, for example, factories, administration buildings, stores, exhibition buildings, shopping centers, banks, open areas, parking areas, airports and so forth, systems are used which detect the intrusion of intruders and direct an intrusion alarm signal to the group of persons responsible for the protection of these objects such as, for instance, security forces or police. The monitoring systems contain a multitude of intrusion detectors which are distributed over the large-area object. These intrusion detectors are connected to a central station or a number of sub-central stations which, on response of the intrusion detector, generate the alarm and pass it on to the object protectors. The intrusion detectors are constructed as infrared detectors, ultrasonic detectors, microwave detectors, sonic detectors, vibration detectors, as well as capacitative detectors. These intrusion detectors commonly respond to environment-caused or detector-specific signals. Intrusion-specific signals such as those, for instance, due to the movement of persons, due to the noise of breaking glass, or due to mechanical action upon walls and objects, generate an electrical signal level in the intrusion detector. This electrical signal level in the intrusion detector totally or partially reaches the alarm threshold depending upon the distance of the intrusion detector from the event or happening. THe intention is that at least that intrusion detector will respond which is closest to the event or happening. An alarm is only generated if a predetermined threshold level is exceeded. The intrusion detectors also respond to spurious signals. Environment-caused spurious signals are, for instance, noises, air turbulences, temperature fluctuations and so forth. Detector-specific spurious signals are, for instance, sensor noise and so forth. When the spurious signals i.e. the environment-caused spurious signals or the detector-specific spurious signals, reach a certain level, the danger of false alarms will increase.

Furthermore, false alarms can occur when components of the intrusion detector deviate from their nominal operating values due to aging, intolerable environmental influences, such as for instance, condensation, vibrations, sabotage actions, and so forth. These false alarms can be a direct result of these deviations. Furthermore, environment-caused spurious signals which are normally suppressed may trigger false alarms due to a parameter deviation in certain components.

In U.S. Pat. No. 3,383,678, an intrusion detector for detecting movement is described which operates according to Doppler Principle. In this patent there is also described a function control of the electrical components of the intrusion detector. This function control is carried out in such a manner that a portion of the transmission power is coupled-out before the antenna and infed via a "motion simulator" at the output of the receiving antenna. The object of the "motion simulator" is to simulate the movement of an intruder and to thereby check the function of the electrical part of the intrusion detector during the presence of an intrusion signal. However, during this check on the operability of the intrusion detector, there can not be determined to what extent individual components of the intrusion detector have deviated from their nominal values. By means of this test there has only been determined the response of the intrusion detector to movement influences. The response of the intrusion detectors during disturbances thereby is not yet tested. The latter implies that the intrusion detector is prone to false alarms. It is noted as a further disadvantage that the check discribed hereinbefore does not permit a localization of the fault in the electrical circuit. The described check is a mere function check which can only be carried out during the operation of the intrusion detector.

SUMMARY OF THE INVENTION

Therefore, with the foregoing in mind, it is a primary object of the present invention to provide a new and improved construction of a testing apparatus for intrusion detectors which does not exhibit the aforementioned drawbacks and shortcomings of the prior art constructions.

Another and more specific object of the present invention aims at providing a new and improved construction of a testing apparatus of the previously mentioned type for testing the responsiveness of an intrusion detector to environment-caused, detector-specific useful and spurious signals and for locating the electrical parameters which deviate from the nominal value.

A further important object of the present invention is directed to a new and improved construction of a testing apparatus to monitor an adjustment of the variable parameters, e.g. sensitivity, integration time, band-pass, threshold values, and other values that require adjustment prior to setting the intrusion detector into operation at its location and under consideration of the environment to be monitored.

At the same time, a further important object of the present invention is directed to a new and improved construction of a testing apparatus permitting to detect parameter deviations already before these lead to a concrete false alarm or non-detection of an intrusion. In this manner, intrusion defective operations of the detector are intended to be avoided by means of early diagnosis.

Apart therefrom, a still further significant object of the present invention is directed to a new and improved construction of a testing apparatus in which the early diagnosis is intended to indicate the fault location in the electronic circuit of the intrusion detector.

Yet a further significant object of the present invention aims at providing a new and improved construction of a testing apparatus of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the testing apparatus of the present invention is manifested by the features that a signal generator is provided for generating test signals, together with an electronic evaluation circuit having inputs and selected coupling-out outputs. A first switching arrangement selectively applies the test signals to desired inputs of the electronic evaluation circuit. A second switching arrangement selectively couples-out the resultant signals generated by the test signals. Finally, a logic control circuit compares the resultant signals with the correct signals and indicates, at the occurrence of a fault in one of the resultant signals, the fault location at indicating means.

The invention relates to active intrusion detectors such as ultrasonic detectors, microwave detectors and capacitative detectors and passive to intrusion detectors such as infrared detectors, sonic detectors and vibration detectors.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
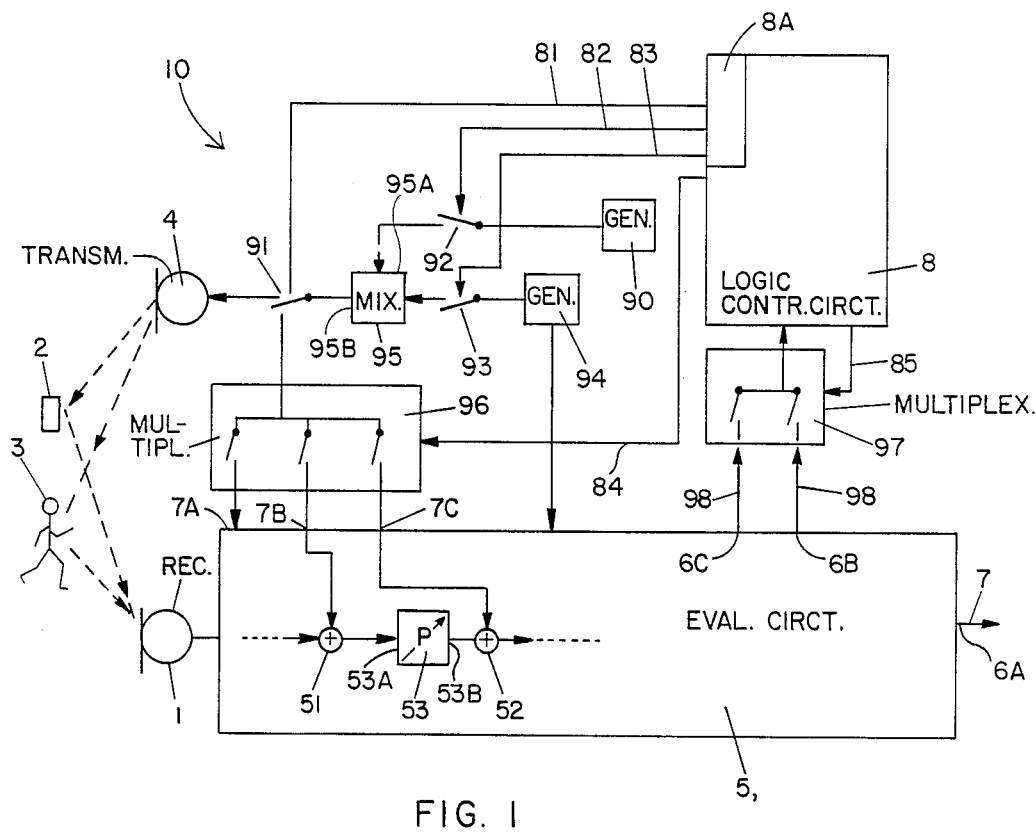
FIG. 1 is a schematic block circuit diagram illustrating a first exemplary embodiment of the inventive testing apparatus for monitoring the electrical parameters in an intrusion detector.

Describing now the drawings, it is to be understood that to simplify the showing thereof, only enough of the structure of the testing apparatus for intrusion detectors has been illustrated therein as is needed to enable one skilled in the art to readily understand the underlying principles and concepts of this invention. Turning now specifically to FIG. 1 of the drawings, the apparatus illustrated therein by way of example and not limitation, will be seen to comprise an acitve intrusion detector 10 in schematic illustration. A sensor or receiving device receives signals from a space 2 to be monitored or from an intruder or object 3, to be monitored, respectively and converts these into electrical signals in an electronic evaluation circuit 5. Such electronic evaluation circuits 5 are generally known to the art. Therefore, the electronic evaluation circuit 5 is not further described in connection with FIG. 1. Such an evaluation circuits 5 generates at its output 6A an alarm signal 7 when the signals received at the sensor or receiving device 1 indicate intrusion activities. With reference to FIG. 1 it will now be demonstrated that the invention, namely the monitoring of electrical parameters at various locations in the evaluation circuit 5, can be used for active intrusion detectors. As already mentioned, ultrasonic detectors, microwave detectors, and capacitative detectors are designated as active intrusion detectors. These intrusion detectors have a transmitter or transmitting device as well as a sensor or receiving device. A logic control circuit 8 drives switching devices or switches 91, 92, 93 into the illustrated positions via the lines. The transmission signal generator 94 can now pass its transmission signal having the transmission frequency $f_o$ via the closed switching devices or switches 93, 91 to a transmitter or transmitting device 4 which radiates this transmission signal having the transmission frequency $f_o$ into the space 2 to be monitored. The radiation reflected by the intruder or object 3 to be monitored is received by the sensor or receiving device 1 and processed in the subsequent electronic evaluation circuit 5.

Figure 3:
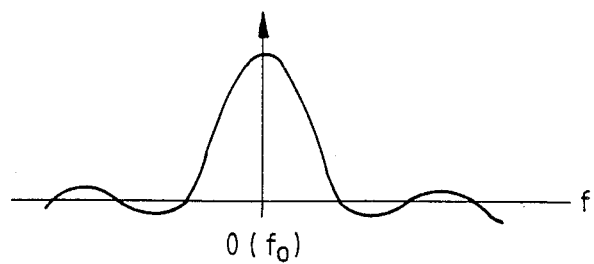
FIG. 3 is a graph representing the frequency spectrum which is generated by a particuarly simple test pulse shape in the testing apparatus shown in FIG. 1.
Figure 5:
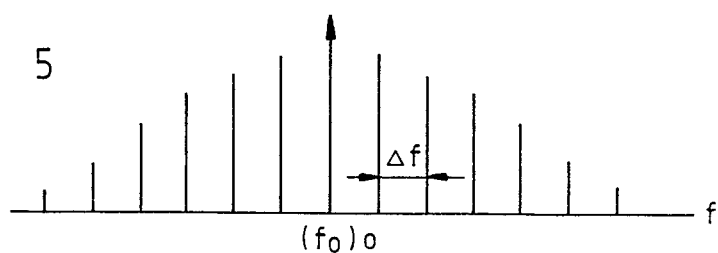
FIG. 5 is a frequency diagram of the spectrum associated with the test function of FIG. 4 in the case that $t_f >> t_p$ in the testing apparatus shown in FIG. 1.
Figure 6:
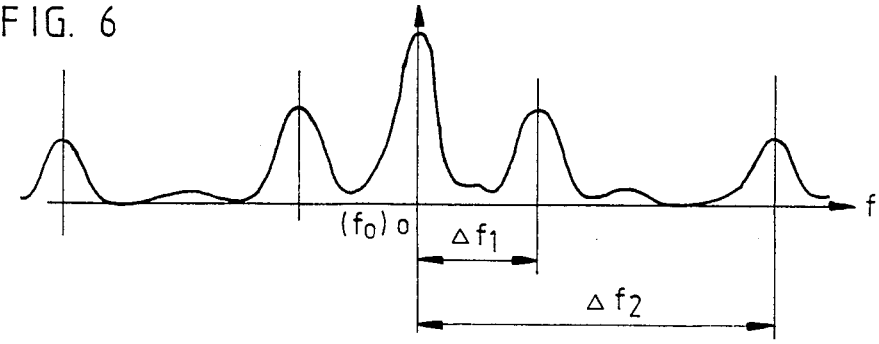
FIG. 6 is a frequency diagram of the spectrum associated with the test function of FIG. 4 for the case that $t_f$ encompasses only a few periods of $t_p$ in the testing apparatus shown in FIG. 1.

If now, during installation, the intrusion detector 10 must be adapted to the peculiarities characteristic of the space 2, this is effected by adjusting the corresponding parameters in the evaluation circuit 5. This will now be further explained hereinbelow. The logic control circuit 8 drives the switch or switching device 91 via the control line or conductor 81 in such a manner that the transmitter 4 is disconnected from the transmission signal generator 94. The logic control circuit 8 drives the switch or switching device 92 via the control line or conductor 82 in such a manner that a test signal generator 90 is connected with a first switching arrangement constituting a multiplex switch or multiplexer 96 via modulating means constituting a mixer stage 95. Such test signal generator 90 may be constructed to generate test signals of any one of the following shapes: substantially triangular, rectangular, saw-tooth or trapezoidal pulses or substantially sinusoidal oscillations. In the mixer stage 95 the test signal having the test frequency $f_x$ and generated by the test signal generator 90 and the transmission signal having the transmission frequency $f_o$ of the transmission signal generator 94 are received on the input side 95A in order to produce modulated test signals on the output side 95B of the mixer stage 95. These modulated test signals are now selectively applied to desired inputs, for example, the inputs 7A, 7B and 7C associated with selected input locations of the evaluation circuit 5 according to a predetermined program which is stored in the logic control circuit 8. The logic control circuit 8 drives the corresponding switches or switching devices in the multiplex switch or multiplexer 96 via a control or conductor 84 such that they are closed. Only input locations 51 and 52 of the input locations of the evaluation circuit 5 are shown in FIG. 1 and these input locations 51 and 52 are respectively connected to the input side 53A and the output side 53B of a component, namely a current circuit 53 of the electronic evaluation circuit 5. For example, the sensitivity of the intrusion detector 10 for the related space 2 to be monitored is intended to be adjusted to optimal conditions by means of adjusting a variable parameter of the current circuit 53. For this purpose, modulated test signals of the type as shown, for example, in FIGS. 3, 5 6, are first supplied to the input 7B associated with the input location 51. In this connection, it is also pointed out that the logic control circuit 8 has driven a second switching arrangement constituting a multiplex switch or multiplexer 97 via a control the line or conductor 85 such that the resultant signals formed as a result of the selective application of the modulated test signals can be received at the outputs 6B and 6C of the evaluation circuit 5 and arrive via control lines or conductors 98 at the logic control circuit 8. At this logic control circuit 8 the modulated test signals are compared with respective stored reference wave trains associated with important resultant signals. If there is no conformity, this is indicated in the logic control circuit 8 by appropriate indicating means. The current circuit 53 is now adjusted by service personnel until the logic control circuit 8 indicates optimum conformity between the resultant signals and the stored reference wave trains. The input of modulated test signals signals at the input location 52 of the evaluation circuit 5 is necessary for checking, during operation, the components of the evaluation circuit 5 which follow the current circuit 53, independently of the value of the adjustable parameter in the current circuit 53.

Figure 8:
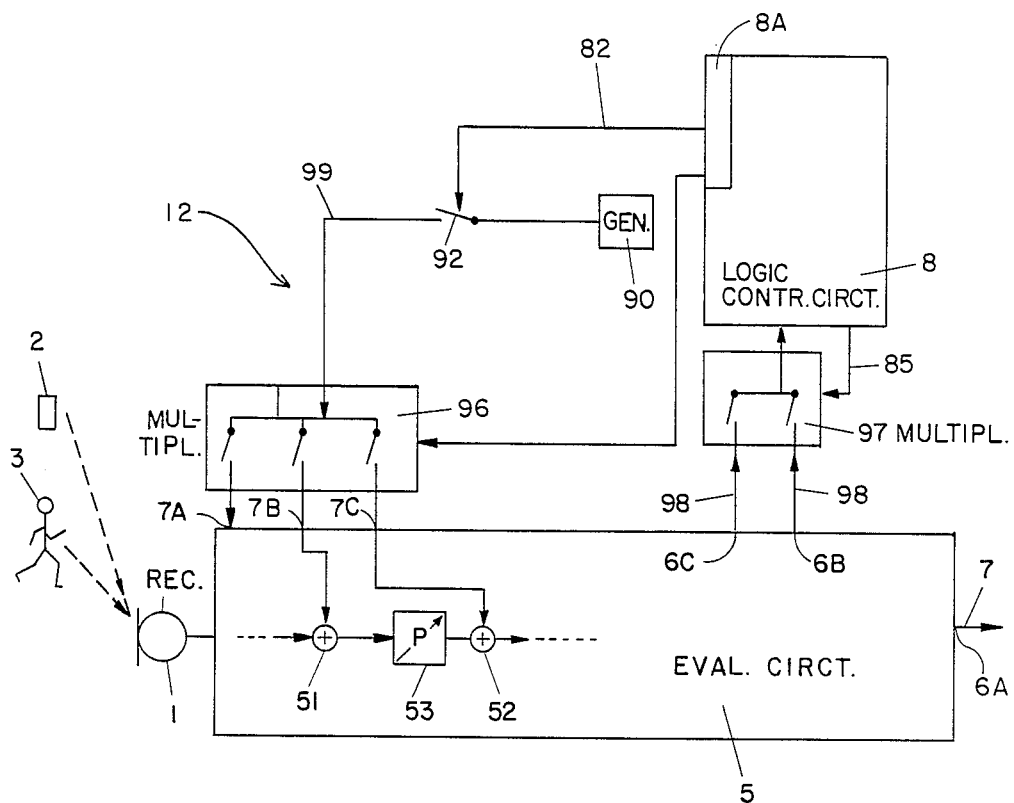
FIG. 8 is a schematic block circiut diagram of a third exemplary embodiment of the inventive intrusion tector.

In the following description, it will now be assumed with reference to FIG. 8 that the intrusion detector 12 shown in FIG. 8 constitutes a passive intrusion detector which, as is well known in the art, does not contain the transmitter or transmitting device 4 but only the sensor or receiving device 1. The control lines or conductors 81 and 83 as well as the the switches 91 and 93, the signal generator 94 and the mixer stage are not present but were present in the active intrusion detector 10 shown in FIG. 1. Such passive intrusion detector 12 may be constructed, for example, as an infrared detector, a sonic detector or a vibration detector. If now, during installation of the passive intrusion detector 12, the test operation is intended to be carried out, the logic control circuit 8 drives the switch or switching device 92 via the control line or conductor 82 such that the test signal generator 90 passes its test signals via the closed switch or switching device 92 and the dash-dotted control line or conductor 99 to the multiplex switch or multiplexer 96 and to the input location 51. The optimum adjustment of the sensitivity of the passive intrusion detector 12 with respect to the space 2 to be monitored with its particularities now follows in the same manner as already discussed in connection with the active intrusion detector 10. However, for the sake of completeness, it is noted that in this case the test signals are not modulated by the transmission frequency $f_o$ since the passive intrusion detector 12, as is well known, does not have a transmitter or transmitting device. For certain circuit components, especially band-pass type arrangements, it can still be advantageous to nevertheless carry out a modulation whereby the transmission frequency $f_o$ is replaced by the corresponding mid-frequency. In a modified embodiment the passive intrusion detector 12 contains a modulating signal generator operating at a predetermined mid-frequency and modulating means connected in circuit in a manner corresponding to the transmission signal generator 4 and the mixer stage 95 in the active intrusion detector 10 shown in FIG. 1.

Figure 2:
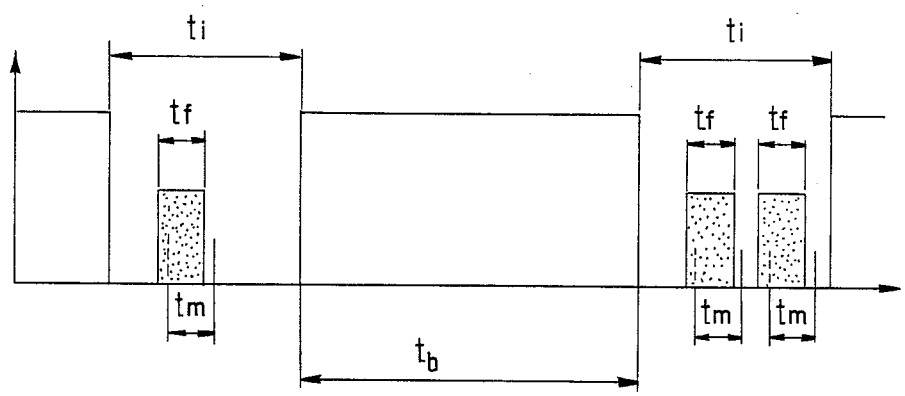
FIG. 2 is a graph representing the time relationship of the monitoring test during the operating period of the intrusion detector using the testing apparatus shown in FIG. 1.

The active intrusion detector 10 shown in FIG. 1 is also checked or tested for the correctness of the electrical parameters of its evaluation circuit 5 at predetermined time intervals during its time of operation. The electrical parameters of the evaluation circuit 5 are, for example, amplification gain, mid-frequency, time constant, band-pass width, threshold values, sensitivity and so forth. FIG. 2 shows the time relationship of the tests or checks during such time of operation. For this purpose, the logic control circuit 8 contains means 8A for defining a sequence of operation periods $t_b$ having a predetermined duration in the range of about 10 sec to about 100 sec and periodically recurring test periods $t_i$ having a predetermined duration in the range of about 100 ms to about 1,000 ms between individual operation periods $t_b$. performed sequentially; then, the test signals generated by the test signal generator 90 are supplied to the corresponding locations at the evaluation circuit 5 within this test time $t_i$ during times $t_f$ ranging from about 40 to 400 ms. If only one test point is provided or in case the input occurs parallel at a number of test points in parallel, then there exists only one period $t_f$ as shown on the left-hand side of FIG. 2. This time period $t_f$ is selected such that disturbances which develop due to any switching states of the electronic components, cannot affect the test signals. During the so-called test clearing time $t_m$, which is offset relative to the time period $t_f$, the resultant signals are detected and evaluated in the logic control circuit 8 via the lines or conductors 98 and the multiplex switch or multiplexer 97. The time indicated in FIG. 2 are valid only with respect to the described exemplary embodiments relating to active and passive intrusion detectors. It will be appreciated that these times can be prolonged or shortened. It is also noted that the logic control circuit 8 shown in FIG. 1 controls the times indicated in FIG. 2.

FIG. 3 shows a frequency spectrum generated by the test signal generator 90 due to the particularly simple test pulse shape of a single rectangular pulse. A modulation, if desired by the transmission frequency $f_o$, merely has the effect of displacing the zero point (0) to the transmission frequency $f_o$. This is symbolically indicated in FIG. 3.

Figure 4:
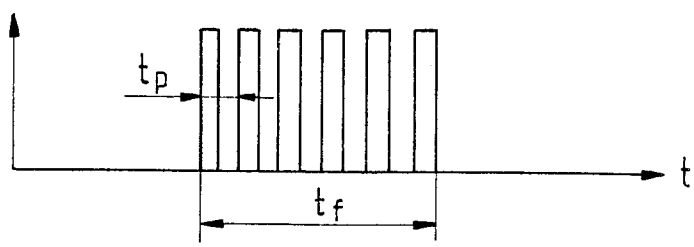
FIG. 4 is a time diagram of a test function in the testing apparatus shown in FIG. 1.

In FIG. 4, a pulse train or series of pulses are plotted on the time abscissa t. The test signal generator 90 shown in FIG. 1 generates these pulse trains or series of pulses which are applied to the desired points or input locations of the evaluation circuit 5 by means of the switch or switching device 92 and the multiplex switch of multiplexer 96 during the time period $t_f$ of, for example, about 40 ms. In FIG. 4, each pulse has a time duration $t_p$.

FIGS. 5 and 6 show frequency spectra which originate from the pulse train shown in FIG. 4 when the time ratio of the pulse width or duration $t_p$ to the time $t_f$ changes over the total pulse train. The various frequency spectra are used for specific tests at special electronic components of the evaluation circuit 5. This will be further described hereinafter in connection with FIG. 7. FIG. 5 shows a frequency spectrum for the case that $t_f > t_p$. The zero point (0) of this spectrum depicted on the frequency abscissa f is shifted to the transmission frequency $f_o$ when the test is made with the active intrusion detector 10 containing the transmitter or transmitting device 4. The form of the spectrum shown in FIG. 5 is used for a point-selective measurement of electrical parameters in the evaluation circuit 5.

The frequency spectrum shown in FIG. 6 and which is plotted on the frequency abscissa f results when the pulse train shown in FIG. 4 and which conventionally is generated by the test signal generator 90 is altered such that the time $t_f$ encompasses only some few periods of the pulse width or duration $t_p$. Since this function is valid for a passive intrusion detector (without transmitter 4 and transmission frequency $f_o$) as well as for an active intrusion detector (with transmitter 4 and transmission frequency $f_o$), both these values are entered on the abscissa f. The form of the frequency spectrum shown in FIG. 6 is suitable for the integral testing of selective current circuits of the evaluation circuit 5. Particular considered in this respect are band-pass filters.

To summarize, it can be said that the test signal generator 90 shown in FIG. 1 can generate frequency spectra of all possible types by alteration of pure pulse trains. Such frequency spectra are useful for the special testing purpose of specific current circuits in the evaluation circuit 5.

Figure 7:
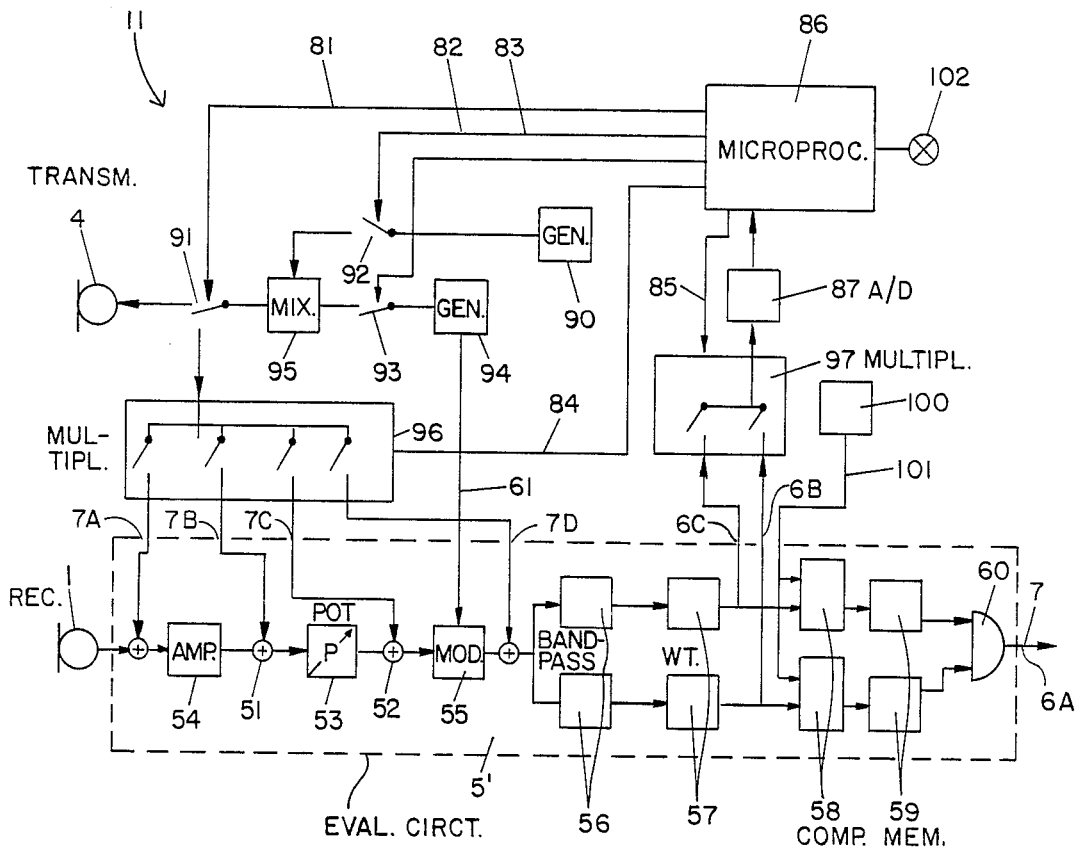
FIG. 7 is a schematic block circuit diagram of a second exemplary embodiment of the inventive intrusion detector in which the tests are carried out during installation and during the time of operation.

FIG. 7 shows as a further exemplary embodiment an active ultrasonic intrusion detector 11. The evaluation circuit 5' contains an amplifier 54, a potentiometer 53, a modulator 55, band-passes 56 and integrators 57, comparators 58 as well as memories 59 with a following AND gate 60. The AND gate 60 generates an alarm signal 7 when output signals exist on both branches of the band-passes 56, the integrators 57, the comparators 58 and the memories 59 at the same time. Since the evaluation circuit 5' is not subject matter of the present invention, this evaluation circuit 5' will not be further described.

The active ultrasonic intrusion detector 11 shown in FIG. 7 also has a transmitter or transmitting device 4 to which the transmission signal having the transmission frequency $f_o$ and generated by the transmission signal generator 94 is supplied via the closed switches or switching device 93 and 91. The transmission signal having the transmission frequency $f_o$ is fed via a line or conductor 61 to the modulator 55. In this modulator 55 the transmission frequency $f_o$ is used to demodulate the signal originating from the sensor or receiving device 1. During operation, the multiplex switches or multiplexers 96 and 97 as well as the switch or switching device 92 are in the open state as shown in FIG. 7. In the exemplary embodiment shown in FIG. 7, the logic control circuit shown in FIG. 1 is constituted by contains a microprocessor 86 which controls the switches or switching device 91, 92, 93 and the multiplex switches or multiplexers 96 and 97 via the control lines or conductors 81, 82, 83, 84 and 85. Furthermore, the microprocessor 86 receives the resultant signals via an analog/digital converter 87 and evaluates these resultant signals. For example, the microprocessor 86 carries out a comparison between the shapes of these resultant signals and the desired wave trains associated with the different check or test points of the evaluation circuit.

In the following, there is explained first the so-called installation test and then the periodically recurrent operating test.

When the alarm device of the active ultrasonic intrusion detector 11 is installed at the location at which the space 2 of the location is to be monitored, then it must be possible to adjust its responsive capability to its optimum value with respect to the space 2 to be monitored. This is effected by means of the microprocessor 86 which places the switch or switching device 91 via the control line or conductor 81 into the position alternate to the position shown in FIG. 7, so that the modulating means or modulator 95 is connected with the input of the multiplex switch or multiplexer 96. Furthermore, the switch or switching device 92 is placed via the control line or conductor 82 into the position alternate to the position shown in FIG. 7 so that the test signal generator 90 can apply its test function, shown in FIG. 4, to the modulator 95. If, now, the program in the microprocessor 86 determines that the test signals of the test signal generator 90 must be modulated by the transmission frequency $f_o$ of the transmission signal generator 94, the the switch or switching device 93 remains in the closed position as shown in FIG. 7. The modulation is carried out in the modulator 95. If the program in the microprocessor 86 determines that no modulation shall be done, the switch or switching device 93 is opened via the control line or conductor 83. In this case the pure test signals of the test signal generator 90 arrive at the multiplex switch or multiplexer 96 via the modulator 95. The microprocessor 86 adjusts according to its program the individual switch elements of the multiplex switch or multiplexer 96 via the control line or conductor 84. The resultant signals are taken-off or tapped-off, e.g. after the integrators 57, and are passed via the lines or conductors 98 to the multiplex switch or multiplexer 97. Since these signals are analog signals, they are converted in the subsequent analog/digital converter 87 and fed as digital values into the microprocessor 86 which compares the resultant signals with the reference wave trains. As already mentioned in connection with FIGS. 3, 4, 5 and 6, the invention permits employing the most favorable frequency spectra as test signals for testing a wide variety of components.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for testing an intrusion detector for responsiveness to detector-specific useful and spurious signals of an environmental origin, comprising:

a test signal generator for generating test signals;

an electronic evaluation circuit having a predetermined number of inputs and a predetermined number of outputs;

said electronic evaluation circuit containing a predetermined number of circuit components each of which is associated with at least one of said predetermined number of inputs and at least one of said predetermined number of outputs of said electronic evaluation circuit;

a first switching arrangement operatively interconnecting said test signal generator and said predetermined number of inputs of said electronic evaluation circuit;

said first switching arrangement selectively applying said test signals generated by said test signal generator to desired ones of said pedetermined number of inputs and thus to desired ones of said predetermined number of circuit components of said electronic evaluation circuit;

a logic control circuit;

a second switching arrangement operatively interconnecting said predetermined number of outputs of said electronic evaluation circuit and said logic control circuit;

said second switching arrangement selectively coupling-out resultant signals generated by said desired circuit components of said electronic evaluation circuit in response to the selective application of said test signals to said desired circuit components;

said logic control circuit controlling the operation of said first and second switching arrangements;

said logic control circuit having stored therein a predetermined number of reference signals associated with said desired circuit components in said electronic evaluation circuit, and receiving through said second switching arrangement said resultant signals generated by said electronic evaluation circuit due to the selective application of said test signals to said desired circuit components, for comparison with said stored reference signals;

indicating means operatively connected to said logic control circuit; and said indicating means indicating a fault in said electronic evaluation circuit when said comparison between said resultant signals and the associated stored reference signals yields a deviation in excess of a predetermined deviation.

2. The apparatus as defined in claim 1, wherein:

the intrusion detector constitutes an active intrusion detector containing a transmitting device;

a transmission signal generator connected to said transmitting device and generating a transmission signal having a predetermined transmission frequency;

modulating means having an input side connected to said test signal generator and to said transmission signal generator;

said modulating means having an output side connected to said first switching arrangement; and said modulating means generating modulated test signals which are selectively applied to said desired inputs of said electronic evaluation circuit through said first switching arrangement.

3. The apparatus as defined in claim 1, wherein:

the intrusion detector constitutes a passive intrusion detector.

4. The apparatus as defined in claim 3, further including:

a signal generator generating a modulating signal having a predetermined mid-frequency;

modulating means having an input side connected to said test signal generator and said modulating signal generator; and said modulating means having an output side connected to said first switching arrangement and supplying modulated test signals to said first switching arrangement.

5. The apparatus as defined in claim 1, wherein:

said logic control circuit contains means defining a sequence of operation periods having a predetermined duration and periodically recurring test periods of a predetermined duration between individual ones of said operation periods of said sequence of operation periods;

said test signal generator selectively applying said test signals via said first switching arrangement to said desired inputs of said electronic evaluation circuit during a predetermined portion of said test period; and said logic control circuit receiving said resultant signals coupled-out from said electronic evaluation circuit via said second switching arrangement during a predetermined time period.

6. An apparatus for testing an intrusion detector for responsiveness to detector-specific useful and spurious signals of an environmental origin, comprising:

a test signal generator for generating test signals;

an electronic evaluation circuit having a predetermined number of inputs and a predetermined number of outputs;

said electronic evaluation circuit containing a predetermined number of circuit components each of which is associated with at least one of said predetermined number of inputs and at least one of said predetermined number of outputs of said electronic evaluation circuit;

a first switching arrangement operatively interconnecting said test signal generator and said predetermined number of inputs of said electronic evaluation circuit;

said first switching arrangement selectively applying said test signals generated by said test signal generator to desired ones of said predetermined number of inputs and thus to desired ones of said predtermined number of circuit components of said electronic evaluation circuit;

a logic control circuit;

a second switching arrangement operatively interconnecting said predetermined number of outputs of said electronic evaluation circuit and said logic control circuit;

said second switching arrangment selectively coupling-out resultant signals generated by said desired circuit components of said electronic evaluation circuit in response to the selective application of said test signals to said desired circuit components;

said logic control circuit controlling the operation of said first and second switching arrangements;

said logic control circuit having stored therein a predetermined number of reference signals associated with said desired circuit components in said electronic evaluation circuit, and receiving through said second switching arrangement said resultant signals generated by said electronic evaluation circuit due to the selective application of said test signals to said desired circuit components, for comparison with said stored reference signals;

indicating means operatively connected to said logic control circuit;

said indicating means indicating a fault in said electronic evaluation circuit when said comparison between said resultant signals and the associated stored reference signals yields a deviation in excess of a predetermined deviation;

said electronic evaluation circuit comprises at least one circuit component of said predetermined number of circuit components and said at least one circuit component having at least one variable parameter and defining an input side and an output side;

two of said desired inputs of said electronic evaluation circuit being respectively connected to said input side and said output side of said at least one circuit component;

said first switching arrangement respectively applying at least two of said test signals generated by said test signal generator to said input side and said output side of said at least one circuit component;

said electronic evaluation circuit producing, as a result of the application of said at least two test signals, at least two resultant signals; and said second switching arrangement feeding said at least two resultant signals to said logic control circuit in order to thereby permit adjustment of said at least one variable parameter of said at least one circuit component to a parameter value determining the operation of said at least one circuit component.

* * * * *

UNITED STATES PATENT AND TRADEMARK OFFICE
CERTIFICATE OF CORRECTION

PATENT NO. : 4,743,886

DATED : May 10, 1988

INVENTOR(S) : PETER STEINER et al

It is certified that error appears in the above-identified patent and that said Letters Patent is hereby corrected as shown below:

Column 1, line 37, please delete "THe" and insert --The--

Column 2, line 11, please delete "discribed" and insert --described--

Column 2, line 45, after "manner," please delete "intrusion" and after "the" please insert --intrusion--

Column 3, line 10, after "and" please insert --to-- and after "passive" please delete "to"

Column 3, line 47, please delete "circiut" and insert --circuit--

Column 3, line 48, please delete "tec-" and insert --detector.--

Column 3, line 49, please delete "tor."

Column 3, line 61, please delete "acitve" and insert --active--

Column 3, line 62, after "device" please insert --1--

Column 4, line 1, please delete "circuits" and insert --circuit--

Column 4, line 14, after "illustrated" please insert --closed-- and after "the" (second occurrence) please insert --respective control-- and after "lines" please insert --or conductors 81, 82 and 83. A-- and please delete ". The"

UNITED STATES PATENT AND TRADEMARK OFFICE
CERTIFICATE OF CORRECTION

PATENT NO. : 4,743,886
DATED : May 10, 1988
INVENTOR(S) : PETER STEINER et al

It is certified that error appears in the above-identified patent and that said Letters Patent is hereby corrected as shown below:

Column 4, line 55, after "control" please insert --line--
Column 4, line 67, after "5" please insert --or--
Column 5, line 3, please delete "the"
Column 5, line 17, please delete "signals" (first occurrence)
Column 5, line 30, after "stage" please insert --95--
Column 6, line 2, please delete "relationship" and insert --relationships--
Column 6, line 10, please delete "performed sequentially;" and insert --Performed sequentially--
Column 6, line 24, please delete "time" and insert --times--
Column 7, line 32, please delete "device" and insert --devices--
Column 7, line 41, please delete "contains"
Column 7, line 43, please delete "device" and insert --devices--

UNITED STATES PATENT AND TRADEMARK OFFICE
CERTIFICATE OF CORRECTION

PATENT NO. : 4,743,886

DATED : May 10, 1988

INVENTOR(S) : PETER STEINER et al

Page 3 of 3

It is certified that error appears in the above-identified patent and that said Letters Patent is hereby corrected as shown below:

Column 8, line 6, please delete "the" (first occurrence) and insert --then--

Signed and Sealed this

Tenth Day of January, 1989

*Attest:*

DONALD J. QUIGG

*Attesting Officer*

*Commissioner of Patents and Trademarks*